US012431110B2

(12) United States Patent
Nowak et al.

(10) Patent No.: US 12,431,110 B2
(45) Date of Patent: Sep. 30, 2025

(54) INSTRUMENT PICKS HAVING A NANO SUCTION LAYER

(71) Applicant: StickItPick LLC, Huntingdon Valley, PA (US)

(72) Inventors: Nicholas G. Nowak, Bryn Athyn, PA (US); David Chamberlain, Hendersonville, TN (US); Jacob Lyda, Jasper, TN (US); Kevin Michael McDonald, Lebanon, TN (US)

(73) Assignee: StickItPick LLC, Huntingdon Valley, PA (US)

( * ) Notice: Subject to any disclaimer, the term of this patent is extended or adjusted under 35 U.S.C. 154(b) by 230 days.

(21) Appl. No.: 18/053,162

(22) Filed: Nov. 7, 2022

(65) Prior Publication Data

US 2023/0141510 A1 May 11, 2023

Related U.S. Application Data

(60) Provisional application No. 63/276,185, filed on Nov. 5, 2021.

(51) Int. Cl.
*G10D 3/173* (2020.01)

(52) U.S. Cl.
CPC .................................... *G10D 3/173* (2020.02)

(58) Field of Classification Search
CPC ............ G10D 3/173; G10D 1/08; G10D 1/00; G10D 3/00
See application file for complete search history.

(56) References Cited

U.S. PATENT DOCUMENTS

2005/0217456 A1* 10/2005 Hodesh .................. G10D 3/173 84/322
2013/0199354 A1* 8/2013 Yavorski ................ G10D 3/173 84/322

* cited by examiner

*Primary Examiner* — Kimberly R Lockett
(74) *Attorney, Agent, or Firm* — Riverside Law LLP

(57) ABSTRACT

An instrument pick is described, which includes a flexible layer and a first nano suction layer attached to a first surface of the flexible layer. Related methods are also described.

5 Claims, 3 Drawing Sheets

INSTRUMENT PICKS HAVING A NANO SUCTION LAYER

CROSS-REFERENCE TO RELATED APPLICATIONS

This application claims priority to U.S. provisional application No. 63/276,185, filed on Nov. 5, 2021 incorporated herein by reference in its entirety.

BACKGROUND OF THE INVENTION

Instrument picks are commonly used to play stringed musical instruments including guitars. Instrument picks allow musicians to switch from finger strumming to pick strumming for a variety of reasons, which includes for example providing a crisp and unique sound, making it easier to play certain musical sequences, and relieving stress on the musician's fingers. Musicians will commonly switch between pick strumming and finger strumming depending on the musical sequence they are playing. However, storing and retrieving the instrument pick is not always simple and easy, especially when doing so frequently throughout a performance.

What is needed in the art is an instrument pick design that allows musicians to quickly switch between finger strumming and pick strumming. The improved design should allow for both quick temporary storage and quick retrieval of the pick. The storage should be conveniently located and easy to access. Further, the improved instrument pick design should not interfere with the musician's ability to play with the pick and will ideally represent an improvement during use over strumming with a conventional pick. Embodiments of the instrument pick described herein meet this need.

SUMMARY OF THE INVENTION

An instrument pick according to one embodiment includes a flexible layer and a first nano suction layer attached to a first surface of the flexible layer. In one embodiment, the flexible layer is configured in a triangular shape with rounded corners. In one embodiment, the first nano suction layer is a circular layer. In one embodiment, the instrument pick includes a second nano suction layer attached to a second surface of the flexible layer opposite the first surface. A method for storing an instrument pick includes the steps of providing the instrument pick and attaching the instrument pick to an instrument surface. A method for retrieving an instrument pick includes the step of retrieving the instrument pick from the instrument surface. In one embodiment, the first nano suction layer comprises a first perimeter that is continuously spaced apart from a perimeter of the flexible layer, wherein the second nano suction layer is a second circular layer comprising a second perimeter that is continuously spaced apart from the perimeter of the flexible layer. In one embodiment, the first and second perimeters continuously overlap. In one embodiment, a portion of the first surface of the flexible layer completely surrounding the footprint of the first nano suction layer is separated from the instrument surface.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION OF THE INVENTION

Figure 1A:
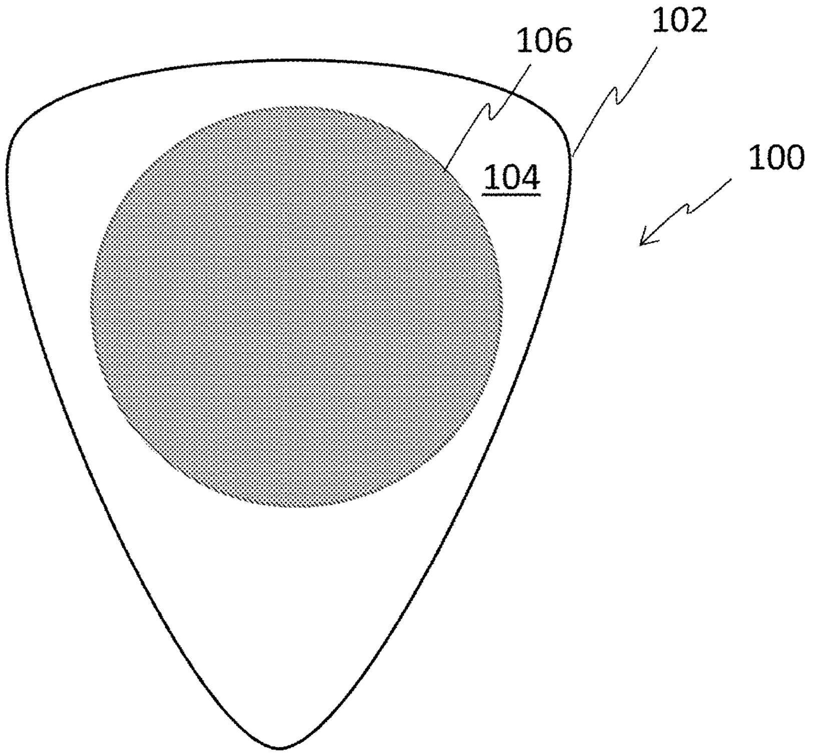
FIG. 1A is first side view of an instrument pick having a nano suction layer according to one embodiment.

It is to be understood that the figures and descriptions of the present invention have been simplified to illustrate elements that are relevant for a more clear comprehension of the present invention, while eliminating, for the purpose of clarity, many other elements found in instrument picks. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is an instrument pick and related methods.

Embodiments of the instrument pick described herein allow musicians to quickly store and retrieve their instrument pick from a surface of their instrument. Storage relies on a nano suction layer, which is capable of maintaining stationary attachment of the pick to the instrument surface. This stationary attachment is maintained throughout lively performances, instrument vibrations and various instrument movements. The design also allows for easy retrieval since edges of the instrument pick are separated from the instrument surface by a gap formed by the thickness of the nano suction layer. The gap allows the instrument pick to be easily lifted for breaking the nano suction seal. This temporary storage solution is easy to reach, easy to see, and allows for variability in placement, representing a large improvement and advantage during performances. Embodiments of the pick do not require permanently mounting anything on the instrument, do not leave any residue on the instrument, and do not damage or alter surfaces of the instrument in any way. Seamless changes between finger strumming and pick strumming improve the quality of the sound and minimizes interruptions between strumming sequences. Further, the improved guitar pick design is tactile to the musician's fingers, improving the musician's grip on the pick and enhancing their ability to play with the pick.

Figure 1B:
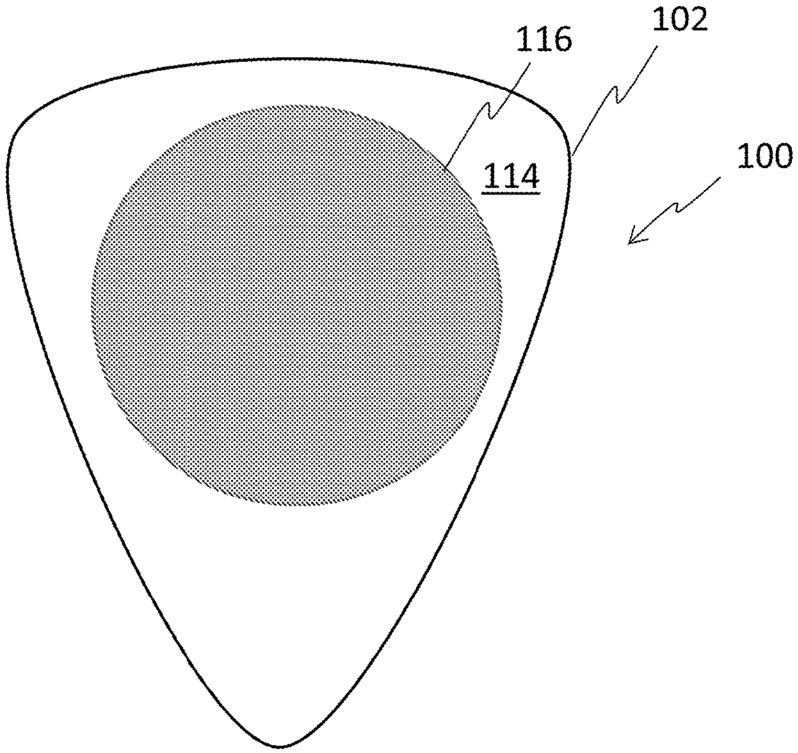
FIG. 1B is an opposite side view of the instrument pick shown in FIG. 1A according to one embodiment.
Figure 1C:
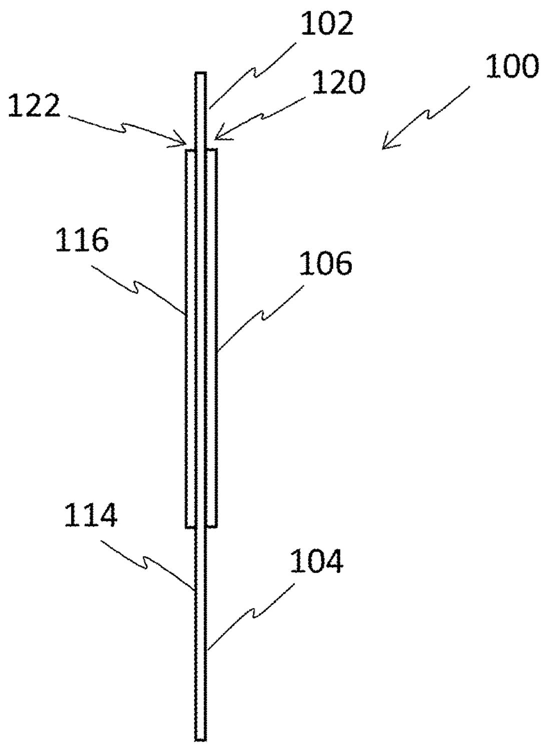
FIG. 1C is an edge view of the instrument pick shown in FIGS. 1A and 1B.
Figure 2:
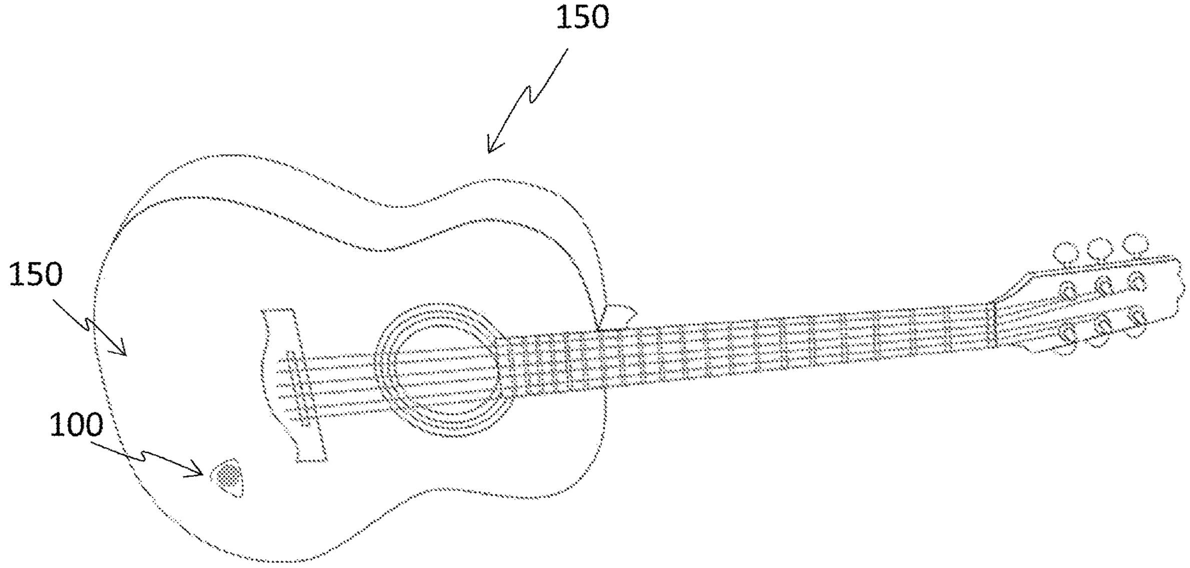
FIG. 2 is a side view of an instrument pick attached to the body of an instrument according to one embodiment.

With reference now to FIGS. 1A-1C, an instrument pick 100 is shown according to one embodiment. The instrument pick 100 includes a flexible layer 102 that can for example be the same material or composition of materials used in conventional instrument picks. The flexible layer 102 has a first surface 104 and a first nano suction layer 106 attached to the first surface 104. The flexible layer 102 can be configured in a triangular shape with rounded corners or any other shape, including shapes typical of instrument picks, particularly guitar picks. In one embodiment, the first nano suction layer 106 can have a perimeter at least partially or fully within the perimeter of the flexible layer 102. In one embodiment, the first nano suction layer 106 is a circular layer fully within the perimeter of the flexible layer 102. The first nano suction layer 106 can be any shape, including a shape approximating the shape of the flexible layer 102, or for example a ring shape having one or more interior openings to the flexible layer 102. In one embodiment, a second nano suction layer 116 is attached to a second surface 114 of the flexible layer 102 opposite the first surface 104. With reference now specifically to FIGS. 1C and 2, since the nano suction layers 106, 116 have an associated thickness, a gap 120, 122 is formed that separates the flexible layer 102 from the instrument surface 150, making the instrument pick 100 easier to lift at the edges for retrieval. Since the nano suction layers are continuously spaced apart from the perimeter of the flexible layer, users can easily pick-up the layer via gaps created between the perimeter of the pick and the instrument surface. The circular nano suction layer combined with the triangular pick shape provides longer gaps at the corners, providing a no-look tactile guide for where pick-up is easiest while maximizing surface area of the nano suction layer. Users may also decide to press down a corner, tilting up an opposite side for easy pick pickup. Having a nano suction layer on each side means these advantages are applied regardless of which side the pick is stored on. These advantages offer a meaningful functional advantage, especially when rapidly switching between using the pick and finger strumming during a performance. Accordingly, a method for storing an instrument pick according to one embodiment includes the steps of providing the instrument pick and attaching the instrument pick to an instrument surface. A method for retrieving an instrument pick includes the step of retrieving the instrument pick from the instrument surface.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Figure 3:
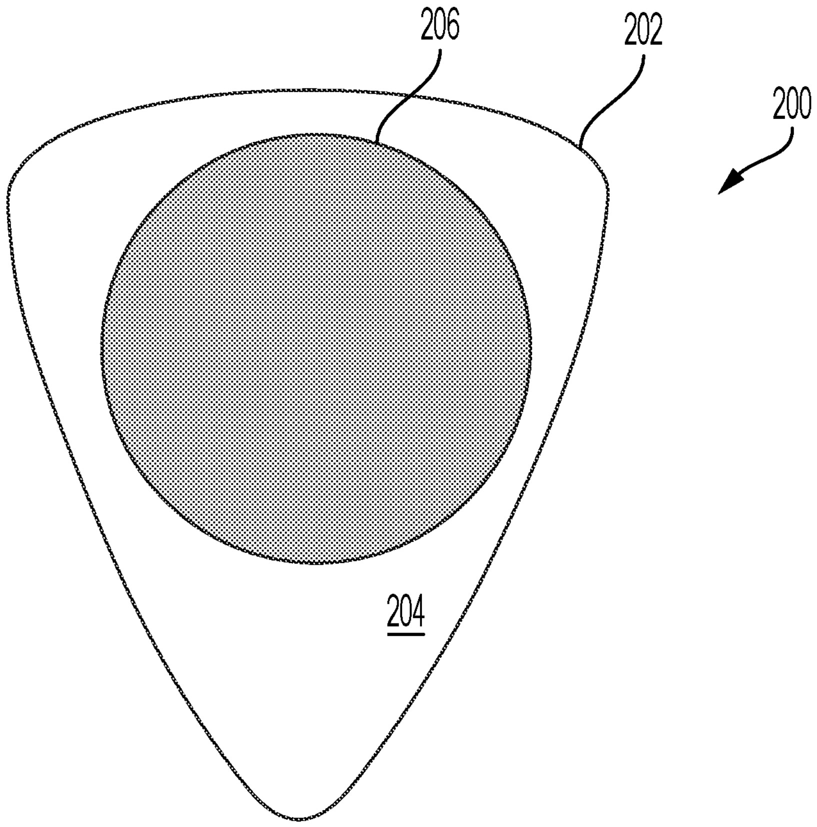
FIG. 3 is an image of a prototype guitar pick having a nano suction layer according to one embodiment.

With reference now to FIG. 3, a prototype instrument pick 200 is shown according to one embodiment. The instrument pick 200 includes a flexible layer 202 having a first surface 204 and a first nano suction layer 206 attached to the first surface 204. A second surface and second nano suction layer are incorporated on the opposite side as described above in previous embodiments.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. An instrument pick comprising:

a flexible layer having a first surface and an opposing second surface, a first nano suction layer attached to the first surface of the flexible layer and a second nano suction layer attached to the second surface of the flexible layer;

wherein the flexible layer is configured in a triangular shape with rounded corners;

wherein the first nano suction layer is a first circular layer having a first circular perimeter continuously surrounded by a portion of the first surface of the flexible layer; and wherein the second nano suction layer is a second circular layer having a second circular perimeter continuously surrounded by a portion of the second surface of the flexible layer.

2. The instrument pick of claim 1, wherein the first and second circular layers have a common diameter, and wherein the first and second circular perimeters have a common and continuous spacing apart from the perimeter of the flexible layer.

3. A method for storing an instrument pick comprising:

providing the instrument pick of claim 1; and attaching the instrument pick to an instrument surface.

4. A method for retrieving an instrument pick comprising:

the method of claim 3; and retrieving the instrument pick from the instrument surface.

5. The instrument pick of claim 1, wherein the triangular shape with rounded corners further comprises first and second rounded corners with a first radius of curvature, and a third rounded corner with a second radius of curvature smaller than the first radius of curvature.

* * * * *